(12) United States Patent
Lin (10) Patent No.: US 8,417,901 B2
(45) Date of Patent: Apr. 9, 2013

(54) COMBINING WRITE COMMANDS TO OVERLAPPING ADDRESSES OR TO A SPECIFIC PAGE

(75) Inventor: Jen-Wen Lin, Kaohsiung (TW)

(73) Assignee: Silicon Motion, Inc., Jhubei, Hsinchu County (TW)

(*) Notice: Subject to any disclaimer, the term of this patent is extended or adjusted under 35 U.S.C. 154(b) by 354 days.

(21) Appl. No.: 12/756,267

(22) Filed: Apr. 8, 2010

(65) Prior Publication Data

US 2011/0078393 A1    Mar. 31, 2011

(30) Foreign Application Priority Data

Sep. 29, 2009  (TW) ................................ 98132892 A (51) Int. Cl.
  *G06F 12/06*  (2006.01)
  *G06F 7/04*  (2006.01)
(52) U.S. Cl. . 711/154; 711/103; 711/167; 711/E12.008; 711/E12.019
(58) Field of Classification Search ................... 711/103, 711/154, 167, E12.007, E12.008, E12.019
  See application file for complete search history.

(56) References Cited

U.S. PATENT DOCUMENTS

| | | | |
|---|---|---|---|
| 6,931,501 B1 * | 8/2005 | Narayanaswamy et al. .. | 711/158 |
| 2003/0056060 A1 * | 3/2003 | Hertz et al. .................. | 711/112 |
| 2004/0024971 A1 | 2/2004 | Bogin et al. | |
| 2008/0091893 A1 * | 4/2008 | Durica et al. .................. | 711/161 |
| 2008/0195804 A1 * | 8/2008 | Kim et al. ...................... | 711/103 |
| 2010/0262721 A1 * | 10/2010 | Asnaashari et al. .............. | 710/5 |

OTHER PUBLICATIONS

Taiwnanese language office action dated Jan. 30, 2013.

* cited by examiner

*Primary Examiner* — Hal Schnee
(74) *Attorney, Agent, or Firm* — McClure, Qualey & Rodack, LLP (57) ABSTRACT

The invention provides a data access method. First, a plurality of commands received from a host is stored in a command queue. A plurality of logical address ranges of the commands is then calculated. A plurality of write commands is then selected from the commands, wherein the logical address ranges of the write commands are overlapping with each other. Whether at least one read command having a receiving order that is in between the receiving orders of the write commands exists in the command queue is then determined. When the at least one read command does not exist, write data corresponding to the write commands are combined together to obtain combined write data according to the logical address ranges of the write commands. A combined write command and the combined write data are then sent to a memory to request that the memory executes the write commands.

24 Claims, 7 Drawing Sheets

COMBINING WRITE COMMANDS TO OVERLAPPING ADDRESSES OR TO A SPECIFIC PAGE

CROSS REFERENCE TO RELATED APPLICATIONS

This Application claims priority of Taiwan Patent Application No. 98132892, filed on Sep. 29, 2009, the entirety of which is incorporated by reference herein.

BACKGROUND OF THE INVENTION

1. Field of the Invention

The invention relates to memories, and more particularly to flash memories.

2. Description of the Related Art

A memory device, such as a memory card, stores data for a host. A memory device usually comprises a controller and at least one memory. The controller operates as a data access interface between the host and the memory card. When the host wants to access the memory, the host sends an access command to the controller. When the controller receives the access command from the host, the controller processes the access command and delivers the processed access command to the memory to drive the memory to perform operations requested by the access command.

Ordinarily, the controller converts a logical address of the access command to a physical address and then delivers the access command and the physical address to the memory. When the host sends a series of write commands to write data to a plurality of logical address ranges, and the logical address ranges corresponding to the write commands are overlapping with each other, the controller still sequentially sends the write commands to the memory without combining the write commands together. Overlapping segments of the logical address ranges are therefore repeatedly written to with data, leading to inefficient use of system resources. In addition, because pages of a flash memory cannot be written again before data stored in the pages are removed, when data of a subsequent write command are written to the pages corresponding to the overlapping segments of the logical address ranges, the controller must spend additional time to remove previously stored data of a prior write command from the pages; thus, causing a delay in processing of the write commands and degrading the performance of the memory device. A data access method is therefore required, which combines a plurality of write commands with overlapping logical address ranges; thus, improving system performance.

In addition, when the memory is a flash memory, data cannot be twice written to a page of a block of the memory. After previously stored data in all pages of the block is cleared at the same time, data can be written to the page again. When a controller continues to write a small amount of data to a specific page of the memory, the controller must repeatedly clear data stored in the block containing the specific page; thus, causing a delay in processing of write commands sent from the host and degrading the performance of the memory device. For example, the host may frequently write amended data of a file allocation table to a specific page storing the file allocation table. A data access method is therefore required to combine a plurality of write commands accessing a specific page of a memory; thus, improving system performance.

BRIEF SUMMARY OF THE INVENTION

The invention provides a data access method for a memory. First, a plurality of commands received from a host is stored in a command queue. A plurality of logical address ranges of the commands is then calculated. A plurality of write commands is then selected from the commands stored in the command queue, wherein the logical address ranges of the write commands are overlapping with each other. Whether at least one read command having a receiving order that is in between the receiving orders of the write commands exists in the command queue is then determined. When the at least one read command does not exist, write data corresponding to the write commands are combined together to obtain combined write data according to the logical address ranges of the write commands. A combined write command and the combined write data are then sent to the memory to request that the memory executes the write commands.

The invention provides a memory device. In one embodiment, the memory device is coupled to a host, and comprises a memory and a controller. The memory is for data storage. The controller stores a plurality of commands received from the host in a command queue, calculates a plurality of logical address ranges of the commands, selects a plurality of write commands with logical address ranges overlapping with each other from the commands stored in the command queue, determines whether at least one read command having a receiving order that is in between the receiving orders of the write commands exists in the command queue, combines write data corresponding to the write commands together to obtain combined write data according to the logical address ranges of the write commands when the at least one read command does not exist, and sends a combined write command and the combined write data to the memory to request that the memory executes the write commands.

The invention also provides a data access method for a memory. First, a plurality of commands received from a host is stored in a command queue. A plurality of logical address ranges of the commands is then calculated. A plurality of write commands is then selected from the commands stored in the command queue, wherein the logical address ranges of the write commands correspond to a specific page of the memory. Whether at least one read command having a receiving order that is in between the receiving orders of the write commands exists in the command queue is then determined. When the at least one read command does not exist, write data corresponding to the write commands are combined together to obtain combined write data according to the logical address ranges of the write commands. A combined write command and the combined write data are then sent to the memory to request that the memory executes the write commands.

The invention provides a memory device. In one embodiment, the memory device is coupled to a host, and comprises a memory and a controller. The memory is for data storage. The controller stores a plurality of commands received from the host in a command queue, calculates a plurality of logical address ranges of the commands, selects a plurality of write commands with logical address ranges corresponding to a specific page of the memory from the commands stored in the command queue, determines whether at least one read command having a receiving order that is in between the receiving orders of the write commands exists in the command queue, combines write data corresponding to the write commands together to obtain combined write data according to the logical address ranges of the write commands when the at least one read command does not exist, and sends a combined write command and the combined write data to the memory to request that the memory executes the write commands.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
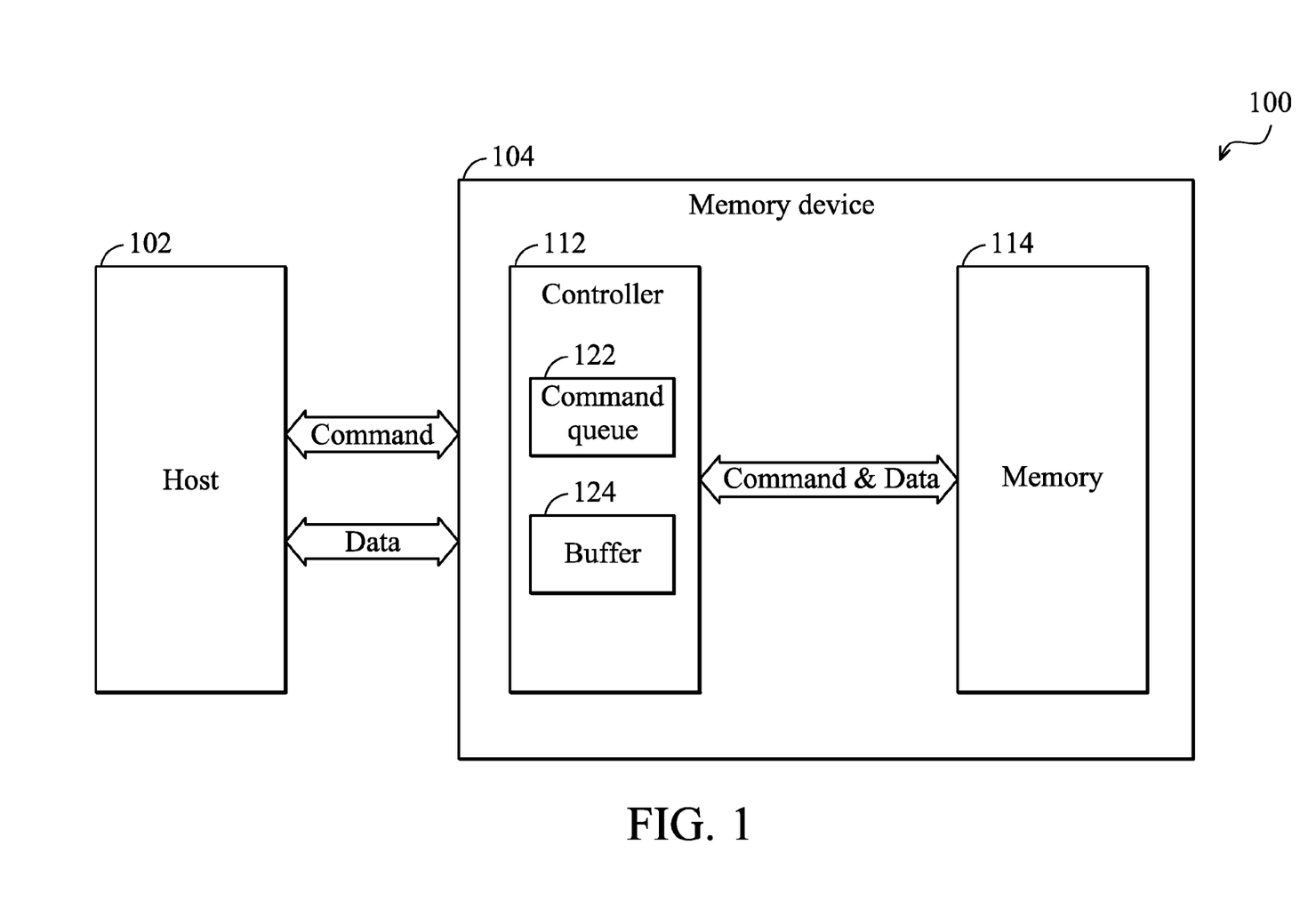
FIG. 1 is a block diagram of a memory device according to the invention.

Referring to FIG. 1, a block diagram of a memory device 104 according to the invention is shown. The memory device 104 is coupled to a host 102 and stores data for the host 102. The host 102 supports a native command queuing (NCQ) function. In one embodiment, the memory device 104 comprises a controller 112 and a memory 114. The controller 112 comprises a command queue 122 and a buffer 124. When the controller 112 receives a plurality of commands from the host 102, the controller 112 stores the commands in the command queue 122. If the commands stored in the command queue 122 comprise a plurality of write commands, the controller 112 determines whether the logical address ranges of the write commands are overlapping with each other. When the logical address ranges of the write commands are overlapping with each other, the controller 112 combines the data of the write commands together to obtain combined write data and stores the combined write data in the buffer 124. The controller 112 then sends a single write command and the combined write data to the memory 114 to request that the memory 114 writes the combined write data thereto. The memory 114 is therefore merely written to with the combined write data of the combined write command instead of repeatedly being written to with data of the write commands. The controller 112 therefore does not need to repeatedly clear previously written data of the write commands from overlapping address segments of the memory 114; thus, reducing time period required for executing the write commands and improving performance of the memory device 104.

Similarly, when the commands stored in the command queue 122 comprise a plurality of write commands, and the logical address ranges of the write commands correspond to a specific page of the memory 114, the controller 112 combines data of the write commands together to obtain combined write data and stores the combined write data in the buffer 124. The controller 112 then sends a single write command and the combined write data to the memory 114 to request that the memory 114 writes the combined write data thereto. The specific page of the memory 114 is therefore merely written to with the combined write data of the combined write command instead of repeatedly being written to with data of the write commands. The controller 112 therefore does not need to repeatedly clear previously written data of the write commands from the specific page of the memory 114; thus, reducing time period required for executing the write commands and improving performance of the memory device 104.

Figure 2A:
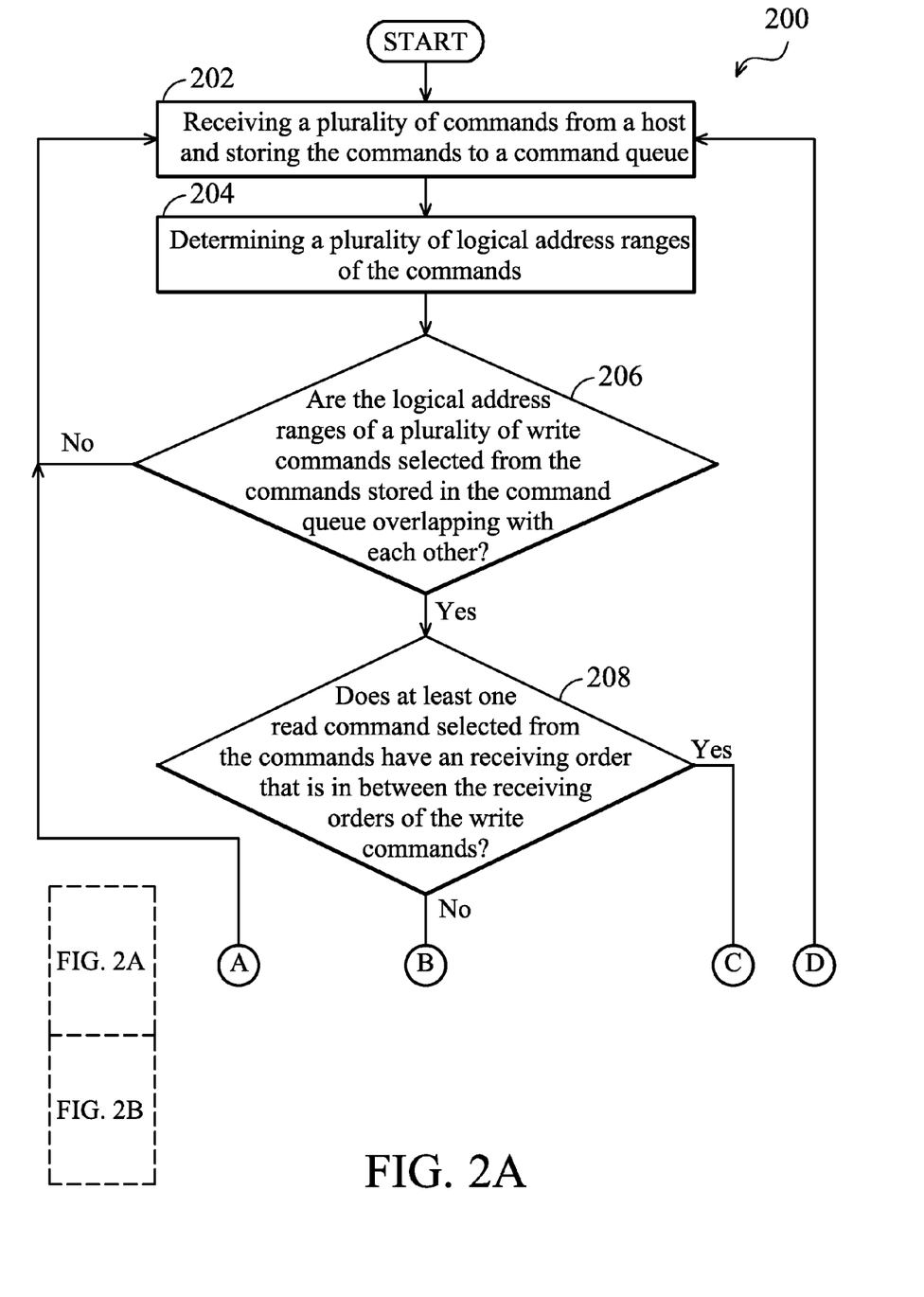
FIG. 2 is a flowchart of a method for accessing data of the memory according to the invention.
Figure 2B:
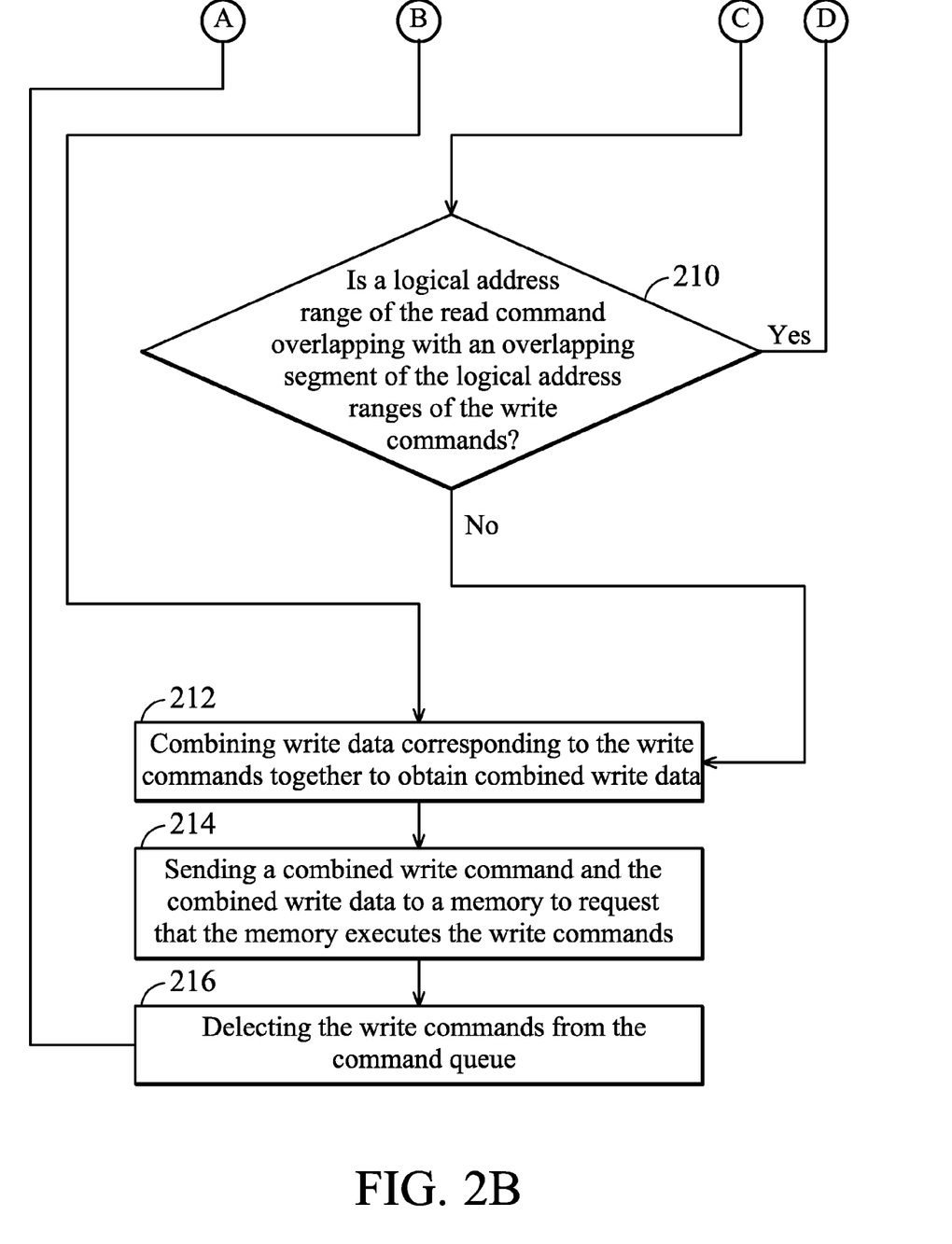

Referring to FIG. 2, a flowchart of a method 200 for accessing data of the memory 114 according to the invention is shown. First, the controller 112 receives a plurality of commands from the host 102 and stores the commands to the command queue 122 (step 202). The controller 112 then determines a plurality of logical address ranges of the commands stored in the command queue 122 (step 204). In one embodiment, the controller 112 first obtains a plurality of starting logical addresses of the commands, then obtains a plurality of data lengths of the commands, and then estimates the logical address ranges of the commands according to the starting logical addresses and the data lengths. For example, the controller 112 adds a data length to a starting logical address to obtain an ending logical address, and takes a range from the starting logical address to the ending logical address as a logical address range.

After the controller obtains the logical address ranges of the commands stored in the command queue 122, the controller 112 determines whether the logical address ranges of a plurality of write commands selected from the commands stored in the command queue 122 overlap with each other (step 206). For example, assume that the command queue 122 stores a first write command and a second write command. When the starting logical address corresponding to the first write command is in between the starting logical address and the ending logical address corresponding to the second write command, the logical address range of the first write command is determined to be overlapping with the logical address range of the second write command. When the starting logical address corresponding to the second write command is in between the starting logical address and the ending logical address corresponding to the first write command, the logical address range of the first write command is also determined to be overlapping with the logical address range of the second write command.

When the logical address ranges of the write commands are overlapping with each other (step 206), the controller 112 determines whether at least one read command selected from the commands have a receiving order that is in between the receiving orders of the write commands (step 208). If the read command having the receiving order that is in between the receiving orders of the write commands exists in the memory 114, the controller 112 determines whether a logical address range of the read command is overlapping with an overlapping segment of the logical address ranges of the write commands (step 210). When the logical address range of the read command is overlapping with the overlapping segment (step 210), the controller 112 should not combine data of the write commands as accuracy of data read according to the read command may be negatively affected.

Figure 3:
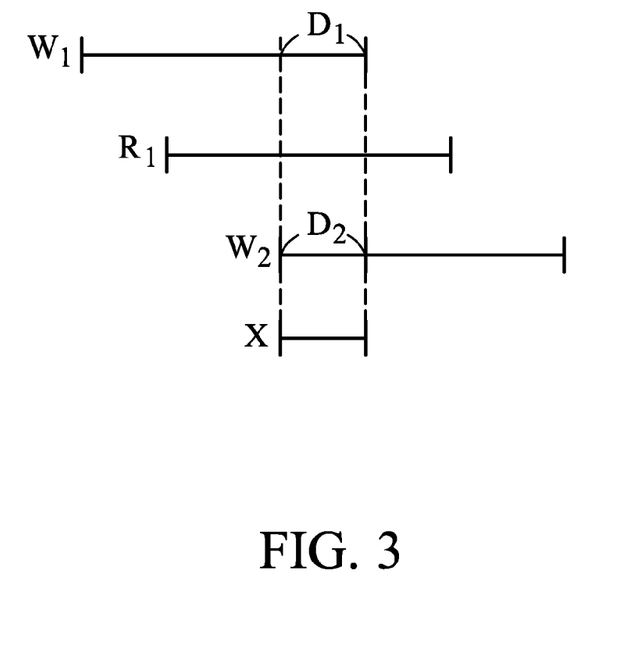
FIG. 3 is a schematic diagram of logical address ranges of two write commands according to the invention.

Referring to FIG. 3, a schematic diagram of logical address ranges of two write commands $W_1$ and $W_2$ according to the invention is shown. The logical address range of the first write command $W_1$ is overlapping with the logical address range of the second write command $W_2$, and an address range X is the overlapping segment of the logical address ranges of the write commands $W_1$ and $W_2$. A read command $R_1$ has a receiving order which is subsequent to that of the first write command $W_1$ and prior to that of the second write command $W_2$. The logical address range of the read command $R_1$ also is overlapping with the overlapping segment X of the logical address ranges of the write commands $W_1$ and $W_2$. The controller 112 therefore should not combine data of the write commands $W_1$ and $W_2$. If the controller 112 replaces the data $D_1$ in the overlapping address segment X with the data $D_2$ of the write command $W_2$, when the controller 112 subsequently executes the read command $R_1$ by reading the overlapping address segment, the controller 112 obtains the data $D_2$ of the second write command $W_2$ rather than data $D_1$ of the first write command $W_1$. The controller 112 therefore cannot combine the write commands $W_1$ and $W_2$.

When there is no read command having a receiving order that is in between the receiving orders of the write commands in the command queue 122 (step 208), or the logical address range of the read command does not overlap with the overlapping segment of the write commands (step 210), the controller 112 combines write data corresponding to the write commands together to obtain combined write data (step 212). In one embodiment, the controller 112 determines a plurality of overlapping segments of the logical address ranges of the write commands, removes data corresponding to the overlapping segments from the write data of the write commands to obtain amended write data corresponding to non-overlapping logical address ranges, and combines the amended write data together to obtain the combined write data.

Figure 4:
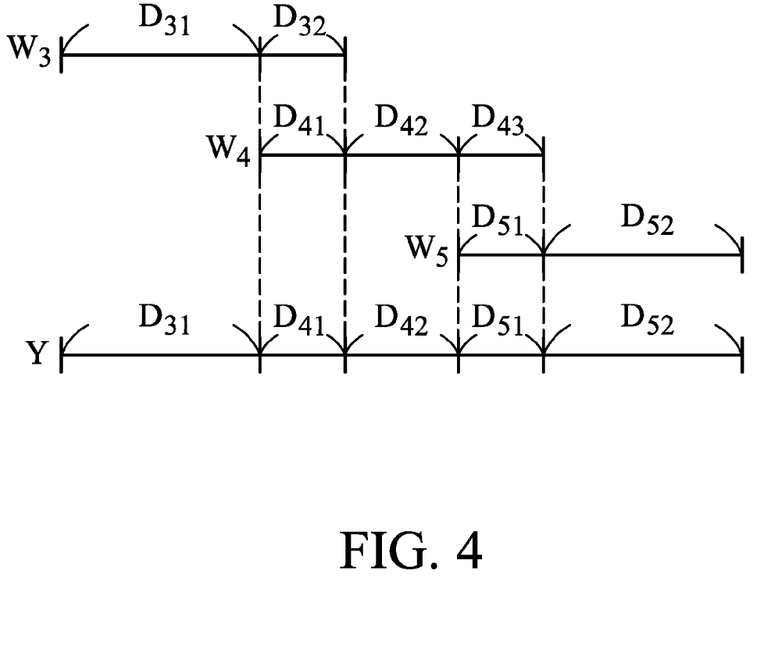
FIG. 4 is a schematic diagram of logical address ranges of three write commands according to the invention.

Referring to FIG. 4, a schematic diagram of logical address ranges of three write commands $W_3$, $W_4$, and $W_5$ according to the invention is shown. The logical address range of the third write command $W_3$ is overlapping with the logical address range of the fourth write command $W_4$, and the logical address range of the fourth write command $W_4$ is overlapping with the logical address range of the fifth write command $W_5$. Assume that the write data corresponding to the write command $W_3$ comprises a data segment $D_{31}$ and an overlapped data segment $D_{32}$, the write data corresponding to the write command $W_4$ comprises an overlapped data segment $D_{41}$, a data segment $D_{42}$, and an overlapped data segment $D_{43}$, and the write data corresponding to the write command $W_5$ comprises an overlapped data segment $D_{51}$ and a data segment $D_{52}$. The controller 112 then removes overlapped data segments $D_{32}$ and $D_{43}$ from the write data of the prior write commands $W_3$ and $W_4$ to obtain amended write data, and combines the amended write data together to obtain the combined write data containing data segments $D_{31}$, $D_{41}$, $D_{42}$, $D_{51}$, and $D_{52}$.

The controller 112 then sends a combined write command and the combined write data to the memory 114 to request that the memory 114 executes the write commands together (step 214). When the memory 114 receives the combined write command, the memory 114 directly writes the combined write data thereto. Because write data corresponding to the overlapping segments of the logical address ranges of the write commands has been previously removed, the controller 112 does not need to repeatedly clear data previously stored in blocks corresponding to the overlapping segments of the logical address ranges of the write commands; thus, reducing system resources consumed for executing the write commands and improving the performance of the memory device 104. Finally, because execution of the write commands is completed, the controller 112 may delete the write commands from the command queue 122 (step 216).

Figure 5A:
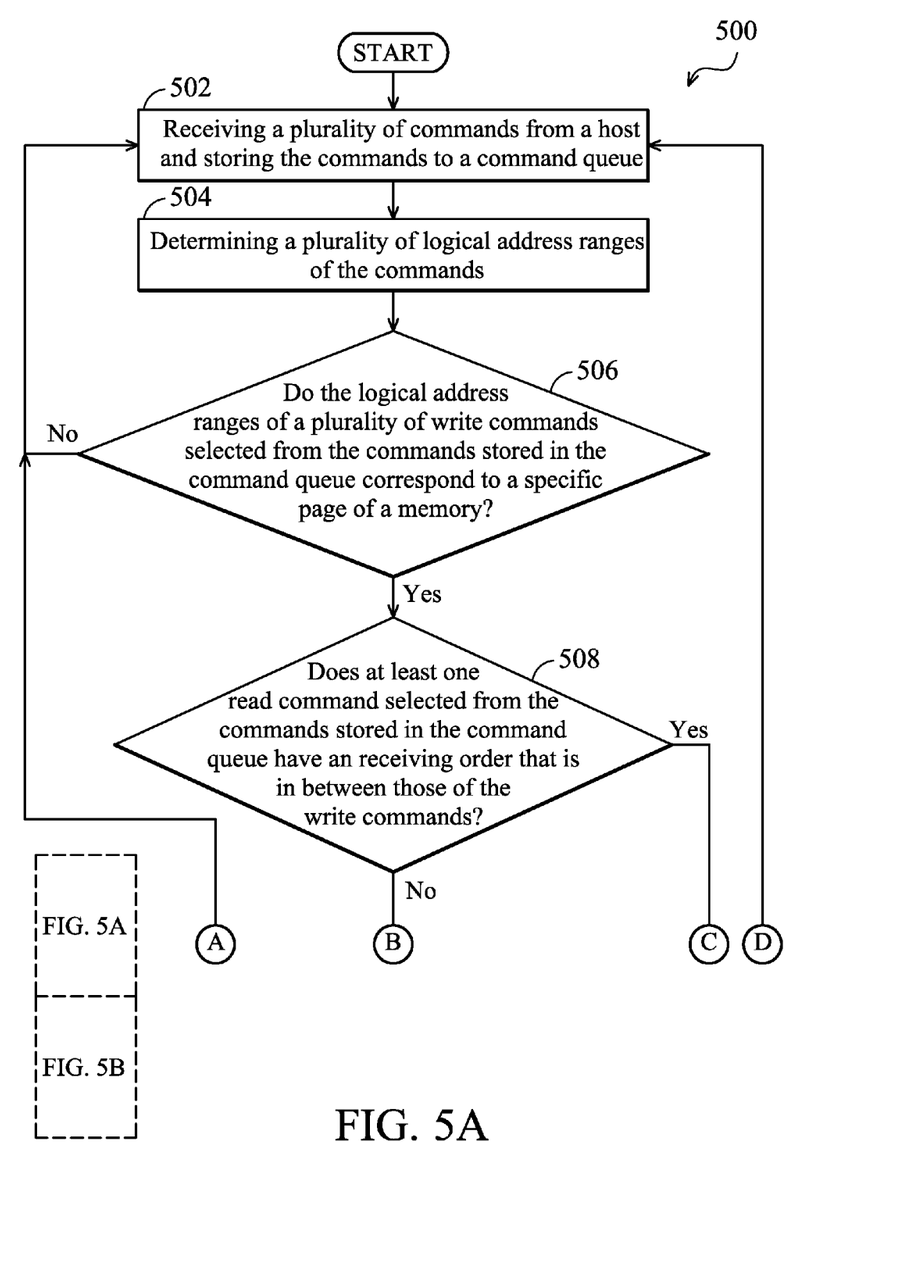
FIG. 5 is a flowchart of another embodiment of a method for accessing data of a memory according to the invention.
Figure 5B:
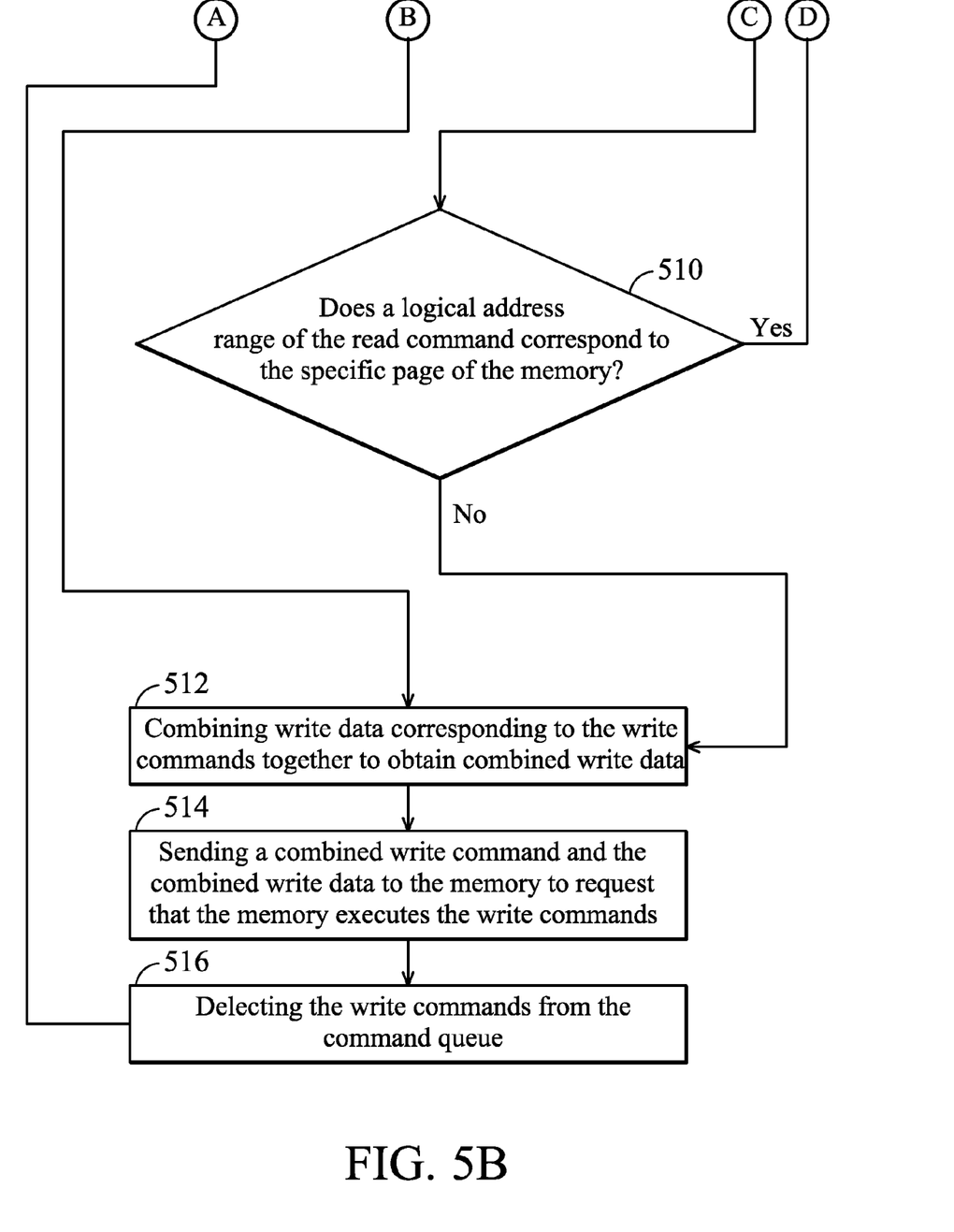

Referring to FIG. 5, a flowchart of another embodiment of a method 500 for accessing data of the memory 114 according to the invention is shown. First, the controller 112 receives a plurality of commands from the host 102 and stores the commands to a command queue 122 (step 502). The controller 112 then determines a plurality of logical address range of the commands (step 504). In one embodiment, the controller 112 obtains a plurality of starting logical addresses of the commands, obtains a plurality of data lengths of the commands, and estimates the logical address ranges of the commands according to the starting logical addresses and the data lengths. For example, the controller 112 adds a data length to a starting logical address to obtain an ending logical address, and takes a range from the starting logical address to the ending logical address as a logical address range.

After the controller 112 obtains the logical address ranges of the commands stored in the command queue 122, the controller 112 determines whether the logical address ranges of a plurality of write commands selected from the commands stored in the command queue 122 correspond to a specific page of the memory 114 (step 506). For example, assume that the command queue 122 stores a first write command. When the starting logical address corresponding to the first write command is subsequent to a starting logical address of the specific page, and the ending logical address corresponding to the first write command is prior to an ending logical address of the specific page, the logical address range of the first write command is determined to be corresponding to the specific page of the memory 114.

When the logical address ranges of the write commands correspond to the specific page of the memory 114 (step 506), the controller 112 determines whether at least one read command selected from the commands has a receiving order that is in between the receiving orders of the write commands (step 508). If the read command having the receiving order that is in between the receiving orders of the write commands exists in the memory 114, the controller 112 determines whether a logical address range of the read command also corresponds to the specific page (step 510). When the logical address range of the read command corresponds to the specific page (step 510), the controller 112 should not combine data of the write commands as accuracy of data read according to the read command may be negatively affected.

When there is no read command having a receiving order intervening between those of the write commands in the command queue 122 (step 508), or the logical address range of the read command does not correspond to the specific page (step 510), the controller 112 then combines write data corresponding to the write commands together to obtain combined write data (step 512). In one embodiment, the controller 112 stores the write data corresponding to the write commands in the buffer 124 according to the logical address ranges of the write commands, and outputs data stored in the buffer 124 to obtain the combined write data, wherein the data capacity of the buffer 124 is equal to the data capacity of the specific page.

Figure 6:
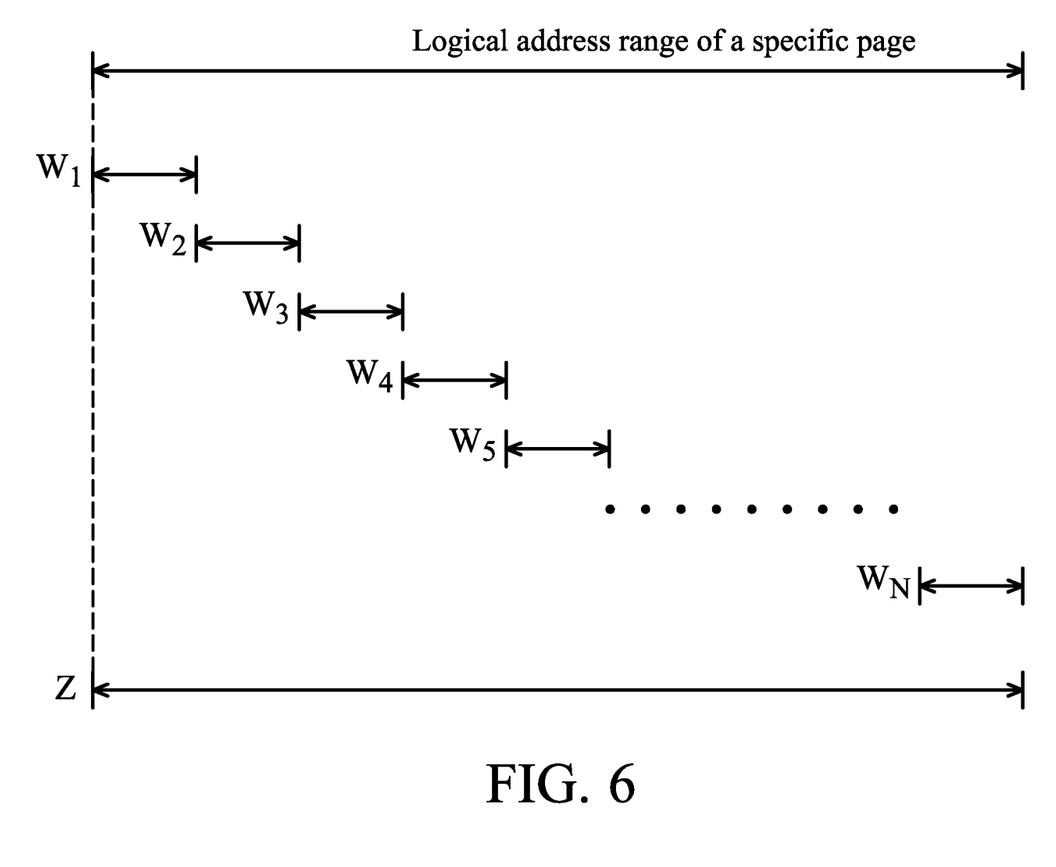
FIG. 6 is a schematic diagram of logical address ranges of a plurality of write commands according to the invention.

Referring to FIG. 6, a schematic diagram of logical address ranges $W_1$, $W_2$, . . . , $W_N$ of a plurality of write commands according to the invention is shown. The logical address ranges $W_1$~$W_N$ do not overlap with each other. The controller 112 therefore does not combine the write commands together according to the method 200 shown in FIG. 2. Because the logical address ranges $W_1$~$W_N$ of the write commands correspond to a logical address range Z of a specific page of the memory 114, the controller 112 therefore combines the write commands together according to the method 500 shown in FIG. 5. After data corresponding to the write commands are combined together, the specific page is written with the combined data, and the controller 112 does not need to frequently clear previously stored data from the specific page; thus, preventing inefficient use of system resources of the memory device 104 and reducing the time periods for executing the write commands. The performance of the memory device 104 is therefore improved.

The controller 112 then sends a combined write command and the combined write data to the memory 114 to request that the memory 114 executes the write commands together (step 514). When the memory 114 receives the combined write command, the memory 114 directly writes the combined write data thereto. Because write data corresponding to the write command has been combined together to form the combined write data, the controller 112 does not need to repeatedly clear data previously stored in the specific page of the memory 114; thus, reducing system resources consumed for executing the write commands and improving the performance of the memory device 104. Finally, because execution of the write commands is completed, the controller 112 may delete the write commands from the command queue 122 (step 516).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data access method for a memory, comprising:
   storing a plurality of commands received from a host in a command queue;
   calculating a plurality of logical address ranges of the commands;
   selecting a plurality of write commands from the commands stored in the command queue, wherein the logical address ranges of the write commands are overlapping with each other;
   determining whether at least one read command having a receiving order that is in between the receiving orders of the write commands exits in the command queue;
   when the at least one read command does not exist, combining write data corresponding to the write commands to obtain combined write data according to the logical address ranges of the write commands; and
   sending a combined write command and the combined write data to the memory to request that the memory executes the write commands.

2. The data access method as claimed in claim 1, wherein the data access method further comprises:
   when the at least one read command exists, determining whether the logical address range of the at least one read command is overlapping with an overlapping segment of the logical address ranges of the write commands;
   when the logical address range of the at least one read command does not overlap with the overlapping segment, combining the write data corresponding to the write commands to obtain the combined write data according to the logical address ranges of the write commands; and
   sending the combined write command and the combined write data to the memory to request that the memory executes the write commands.

3. The data access method as claimed in claim 1, wherein calculation of the logical address ranges of the commands comprise:
   obtaining a plurality of starting logical addresses of the commands;
   obtaining a plurality of data lengths of the commands; and
   estimating the logical address ranges of the commands according to the starting logical addresses and the data lengths.

4. The data access method as claimed in claim 1, wherein combination of the write data comprises:
   determining a plurality of overlapping segments of the logical address ranges of the write commands;
   removing data corresponding to the overlapping segments from the write data of the write commands to obtain amended write data corresponding to non-overlapping logical address ranges; and
   combining the amended write data to obtain the combined write data.

5. The data access method as claimed in claim 1, wherein the commands comprise a first write command and a second write command, and the logical address range of the first write command is determined to be overlapping with the logical address range of the second write command when a starting logical address corresponding to the first write command is in between the starting logical address and an ending logical address corresponding to the second write command, or when the starting logical address corresponding to the second write command is in between the starting logical address and the ending logical address corresponding to the first write command.

6. The data access method as claimed in claim 1, wherein the data access method further comprises:
   after the combined write command and the combined write data are sent to the memory, deleting the write commands from the command queue.

7. A memory device, coupled to a host, comprising:
   a memory, for data storage; and
   a controller, storing a plurality of commands received from the host in a command queue, calculating a plurality of logical address ranges of the commands, selecting a plurality of write commands with logical address ranges overlapping with each other from the commands stored in the command queue, determining whether at least one read command having a receiving order that is in between the receiving orders of the write commands exits in the command queue, combining write data corresponding to the write commands to obtain combined write data according to the logical address ranges of the write commands when the at least one read command does not exist, and sending a combined write command and the combined write data to the memory to request that the memory executes the write commands.

8. The memory device as claimed in claim 7, wherein when the at least one read command exists, the controller determines whether the logical address range of the at least one read command is overlapping with an overlapping segment of the logical address ranges of the write commands, and when the logical address range of the at least one read command does not overlap with the overlapping segment, the controller combines the write data corresponding to the write commands to obtain the combined write data according to the logical address ranges of the write commands, and sends the combined write command and the combined write data to the memory to request that the memory executes the write commands.

9. The memory device as claimed in claim 7, wherein when the controller calculates the logical address ranges of the commands, the controller obtains a plurality of starting logical addresses of the commands, obtains a plurality of data lengths of data of the commands, and estimates the logical address ranges of the commands according to the starting logical addresses and the data lengths.

10. The memory device as claimed in claim 7, wherein when the controller combines the write data, the controller determines a plurality of overlapping segments of the logical address ranges of the write commands, removes data corresponding to the overlapping segments from the write data of the write commands to obtain amended write data corresponding to non-overlapping logical address ranges, and combines the amended write data to obtain the combined write data.

11. The memory device as claimed in claim 7, wherein the commands comprise a first write command and a second write command, and the controller determines that the logical address range of the first write command is overlapping with the logical address range of the second write command when a starting logical address corresponding to the first write command is in between the starting logical address and a ending logical address corresponding to the second write command, or when the starting logical address corresponding to the second write command is in between the starting logical address and the ending logical address corresponding to the first write command.

12. The memory device as claimed in claim 7, wherein after the combined write command and the combined write data are sent to the memory, the controller deletes the write commands from the command queue.

13. A data access method for a memory, comprising:
    storing a plurality of commands received from a host in a command queue;
    calculating a plurality of logical address ranges of the commands;
    selecting a plurality of write commands from the commands stored in the command queue, wherein the logical address ranges of the write commands correspond to a specific page of the memory;
    determining whether at least one read command having a receiving order that is in between the receiving orders of the write commands exists in the command queue;
    when the at least one read command does not exist, combining write data corresponding to the write commands to obtain combined write data according to the logical address ranges of the write commands; and
    sending a combined write command and the combined write data to the memory to request that the memory executes the write commands.

14. The data access method as claimed in claim 13, wherein the data access method further comprises:
    when the at least one read command exists, determining whether the logical address range of the at least one read command corresponds to the specific page of the memory;
    when the logical address range of the at least one read command does not correspond to the specific page, combining the write data corresponding to the write commands to obtain the combined write data according to the logical address ranges of the write commands; and
    sending the combined write command and the combined write data to the memory to request that the memory executes the write commands.

15. The data access method as claimed in claim 13, wherein calculation of the logical address ranges of the commands comprise:
    obtaining a plurality of starting logical addresses of the commands;
    obtaining a plurality of data lengths of the commands; and
    estimating the logical address ranges of the commands according to the starting logical addresses and the data lengths.

16. The data access method as claimed in claim 13, wherein combination of the write data comprises:
    storing the write data corresponding to the write commands in a buffer according to the logical address ranges of the write commands; and
    outputting data stored in the buffer to obtain the combined write data;
    wherein the data capacity of the buffer is equal to the data capacity of the specific page.

17. The data access method as claimed in claim 13, wherein the commands comprise a first write command, and the logical address range of the first write command is determined to be corresponding to the specific page of the memory when a starting logical address corresponding to the first write command is subsequent to a first starting logical address of the specific page and an ending logical address corresponding to the first write command is prior to a first ending logical address of the specific page.

18. The data access method as claimed in claim 13, wherein the data access method further comprises:
    after the combined write command and the combined write data are sent to the memory, deleting the write commands from the command queue.

19. A memory device, coupled to a host, comprising:
    a memory, for data storage; and
    a controller, storing a plurality of commands received from the host in a command queue, calculating a plurality of logical address ranges of the commands, selecting a plurality of write commands with logical address ranges corresponding to a specific page of the memory from the commands stored in the command queue, determining whether at least one read command having a receiving order that is in between the receiving orders of the write commands exists in the command queue, combining write data corresponding to the write commands to obtain combined write data according to the logical address ranges of the write commands when the at least one read command does not exist, and sending a combined write command and the combined write data to the memory to request that the memory executes the write commands.

20. The memory device as claimed in claim 19, wherein when the at least one read command exists, the controller determines whether the logical address range of the at least one read command corresponds to the specific page of the memory, and when the logical address range of the at least one read command does not correspond to the specific page, the controller combines the write data corresponding to the write commands to obtain the combined write data according to the logical address ranges of the write commands, and sends the combined write command and the combined write data to the memory to request that the memory executes the write commands.

21. The memory device as claimed in claim 19, wherein when the controller calculates the logical address ranges of the commands, the controller obtains a plurality of starting logical addresses of the commands, obtains a plurality of data lengths of the commands, and estimates the logical address ranges of the commands according to the starting logical addresses and the data lengths.

22. The memory device as claimed in claim 19, wherein when the controller combines the write data, the controller stores the write data corresponding to the write commands in a buffer according to the logical address ranges of the write commands, and outputs data stored in the buffer to obtain the combined write data, wherein the data capacity of the buffer is equal to the data capacity of the specific page.

23. The memory device as claimed in claim 19, wherein the commands comprise a first write command, and the controller determines that the logical address range of the first write command corresponds to the specific page of the memory when a starting logical address corresponding to the first write command is subsequent to a first starting logical address of the specific page and an ending logical address corresponding to the first write command is prior to a first ending logical address of the specific page.

24. The memory device as claimed in claim 19, wherein after the combined write command and the combined write data are sent to the memory, the controller deletes the write commands from the command queue.

* * * * *